(12) United States Patent
Eddington

(10) Patent No.: US 7,799,178 B2
(45) Date of Patent: Sep. 21, 2010

(54) DISTILLATION PROCESS

(75) Inventor: Michael J. Eddington, Overland Park, KS (US)

(73) Assignee: Black & Veatch Holding Company, Overland Park, KS (US)

( * ) Notice: Subject to any disclaimer, the term of this patent is extended or adjusted under 35 U.S.C. 154(b) by 1104 days.

(21) Appl. No.: 11/315,975

(22) Filed: Dec. 22, 2005

(65) Prior Publication Data

US 2006/0157338 A1 Jul. 20, 2006

Related U.S. Application Data

(60) Provisional application No. 60/642,446, filed on Jan. 7, 2005.

(51) Int. Cl.
- *B01D 1/22* (2006.01)
- *B01D 1/26* (2006.01)
- *B01D 3/28* (2006.01)
- *C02F 1/08* (2006.01)
- *C02F 1/16* (2006.01)

(52) U.S. Cl. .................. 203/10; 159/13.2; 159/17.1; 159/49; 159/DIG. 8; 203/25; 203/27; 203/72; 203/89; 203/DIG. 9

(58) Field of Classification Search ............ 203/10, 203/25, 27, 72, 89, DIG. 8, DIG. 9; 159/13.2, 159/17.1, 26.1, 49, DIG. 8
See application file for complete search history.

(56) References Cited

U.S. PATENT DOCUMENTS

| | | | |
|---|---|---|---|
| 3,147,072 A | 9/1964 | Thomsen | |
| 3,446,712 A | 5/1969 | Othmer | |
| 3,607,668 A | 9/1971 | Williamson | |
| 3,649,469 A | 3/1972 | MacBeth | |
| 3,871,968 A * | 3/1975 | Wood et al. | 202/173 |
| 3,941,663 A | 3/1976 | Steinbruchel | |
| 4,046,639 A | 9/1977 | Carson | |
| 4,072,579 A | 2/1978 | Carson | |
| 4,094,747 A | 6/1978 | Pfenninger | |
| 4,238,296 A | 12/1980 | Sadhukhan | |
| 4,310,387 A | 1/1982 | Sadhukhan | |
| 4,376,679 A | 3/1983 | Liu | |
| 4,676,870 A * | 6/1987 | Stewart et al. | 159/17.1 |
| 4,756,797 A * | 7/1988 | Elmore et al. | 159/13.1 |
| 5,395,483 A | 3/1995 | Al-Hawaj | |
| 5,622,605 A | 4/1997 | Simpson et al. | |
| 5,645,693 A | 7/1997 | Gode | |
| 5,730,836 A * | 3/1998 | Greig et al. | 159/2.3 |
| 5,853,549 A | 12/1998 | Sephton | |
| 5,925,223 A | 7/1999 | Simpson et al. | |
| 6,309,513 B1 | 10/2001 | Sephton | |
| 6,444,095 B1 * | 9/2002 | Evans et al. | 202/174 |
| 2003/0121856 A1 | 7/2003 | Voutchkov | |
| 2007/0131532 A1 * | 6/2007 | Laitinen et al. | 203/10 |
| 2007/0151840 A1 * | 7/2007 | Nurminen et al. | 203/10 |

OTHER PUBLICATIONS

"The ABCs of Desalting" by O.I. Buros, International Desalination Association, Topsfield, Mass., Second Edition.

(Continued)

*Primary Examiner*—Virginia Manoharan
(74) *Attorney, Agent, or Firm*—F. Lindsey Scott

(57) ABSTRACT

An improved method for efficiently adding additional heat values into a distillation process to optimize the production of distillate from water.

12 Claims, 8 Drawing Sheets

OTHER PUBLICATIONS

*Fundamentals of Salt Water Desalination*, by Hisham T. El-Dessouky and Hisham M. Ettouney, Kuwait University, Elsevier Science B.V., 2002, pp. 81-85, 110-113, 129-131, 260-269, 2002.

"Understand Thermal Desalination," by Hisham T. El-Dessouky and Hisham M. Ettouney, Kuwait University, Chemical Engineering Progress, Sep. 1999.

"Seawater Multi-effect Distillation Energized By A Combustion Turbine," by Victor Dvornikov, Elsevier Science B.V., 2000.

"Comparison of Multiple Effect Distillation And Reverse Osmosis For New Providence Island," by E. George Moss, Edwin T. Hunt and Curtis A. Kiefer, Proposal, 1993.

"Experimental Heat Transfer Analysis of Multiple-Effect Desalination Pilot Plant," by Dae-Jun Chang, Hyun-Sung Choi, Gil-Ju Jung, Yang-Gyu Kim, Sand-Kune Lee and Seok-Lyong Song, International Desalination Association, Abstract BAH03-099, 2003.

* cited by examiner

DISTILLATION PROCESS

RELATED CASES

This application is entitled to and hereby claims the benefit of the filing date of U.S. provisional application No. 60/642,446 entitled "Distillation Process" filed Jan. 7, 2005 by Michael J. Eddington.

FIELD OF THE INVENTION

The present invention is related to distillation processes and particularly to an improved process for efficiently adding additional heat values into the process at selected points to optimize the production of distillate from water.

BACKGROUND OF THE INVENTION

Multi-effect and single effect distillation processes have long been used to produce distillate from feed water streams containing dissolved materials. These processes have been used for the production of desalinated (distillate) water from seawater (salt water) and the like. Basically, such distillation processes use one or a series of vessels (effects) and use the principles of evaporation and condensation at reduced ambient pressure in the various effects. This permits a feed water stream to undergo evaporation without the need to supply additional heat after the first effect.

Generally an effect consists of a vessel, a heat exchanger and devices for transporting various fluids between the effects. Processes using a single effect are also known. Diverse designs have been used for the heat exchanger, such as horizontal tubes with a falling water film on the outside, vertical tubes with a falling water film on the inside, or plates with a falling water film and the like.

There are various methods for adding feed water to a multi-effect distillation system. In one embodiment, the feed water is added in equal portions to the various effects. The feed water is sprayed or otherwise distributed onto the evaporator surfaces in an effect in a thin film to promote rapid evaporation after it has been preheated. The surfaces in the first effect may be heated by steam or any other suitable heating fluid or method, such as vapor compression. The distillate vapor produced in the last effect may be condensed. This condenser may be cooled by an inlet water containing feed and cooling water. In this way the feed water is heated by means considered internal to the desalination process.

Only a portion of the feed water applied to the heat transfer surfaces is evaporated. The remaining feed water in each effect is concentrated and may be discarded or fed to the next effect where some of the brine flashes into distillate vapor. This vapor is also part of the heating process. All water evaporated and subsequently condensed inside the effects is a distillate product.

The reduced pressure in each of the effects in the multi-effect distillation process is maintained as well known to the art. The thermal efficiency of the process depends in part upon the number of effects, with from 1 to about 16 effects being found in some plants. Desirably, temperatures in the first effect are from about 70 to about 160° F., which reduces the potential for scaling of some feed water streams on the heat transfer surfaces. High temperature additives or other processes, such as nano-filtration, may permit higher temperatures.

Highly efficient multi-effect distillation plants require a considerable number of effects and large heat transfer areas and are therefore used in situations where energy costs are high. In cases where low cost steam is available, the number of distillation effects and corresponding capital costs are significantly reduced. In some multi-effect distillation applications, a thermal vapor compression cycle may be added to the system. If desired, mechanical vapor compression systems may be substituted. This can considerably reduce the number of effects and the surface area required for the same capacity.

In many instances the cost of steam used for heating is a significant portion of the overall expense of the total process operating costs. Accordingly, a continuing effort has been directed to the development of methods which allow optimization of the use of high quality steam used for heating the heat exchange surfaces of the first effect in the distillation process. While some heating can be achieved by heat exchanging an inlet water stream containing feed and cooling water with the produced distillate vapor in a condenser, the temperature of the feed water leaving the condenser is below the level desired for efficient operation of the process. Accordingly, this feed water may be preheated with distillate vapor produced in the distillation process to bring it to a suitable temperature for use in the effects. As indicated previously, it would be highly desirable to optimize the efficiency of the use of high quality steam by recovering as much distillate as possible per unit of high quality steam. Further, the feed water stream may be heated by other internal means, such as heat exchange with the condensate, brine, inter and after condensers from a vacuum system, pumps, or the like, or the feed water may be fed without heating to the effects.

SUMMARY OF THE INVENTION

According to the present invention, a method is provided for economically supplying additional heat to a distillation process comprising a plurality of effects by heating a portion of a feed water stream by heat exchange with an external heat source to produce a heated feed water stream and charging at least a portion of the heated feed water stream or a mixture of the heated feed water stream and the feed water stream to at least two effects.

The invention further comprises: a distillation method for producing distillate from feed water containing at least one dissolved material in a plurality of effects, each effect comprising a vessel, a heat exchanger and devices for transporting associated fluids, the method comprising: optionally passing a portion of a feed water at a first temperature to at least one effect and through a heat exchanger in at least one effect to produce a distillate vapor and a brine from at least one effect; separating the distillate vapor from the brine; heating at least a portion of the heat exchangers by passing a stream comprising at least one of steam and distillate vapor from a downstream effect to the heat exchanger in the first effect at a second temperature; and, further passing a second quantity of the feed water to heat exchange with an external additional heat source to produce a heated feed water at a third temperature greater than the first temperature; and, passing a portion of the heated feed water to at least two effects at a desired temperature.

The invention also comprises: a distillation method for producing distillate from a feed water containing at least one dissolved material in a plurality of effects, each of the effects comprising a vessel, a heat exchanger and devices for transporting associated fluids, the method comprising; optionally passing a first portion of a feed water at a first temperature to a first effect, heating the heat exchanger in the first effect by passing a stream comprising at least one of steam and distillate vapor from a downstream effect to the heat exchanger in the first effect at a second temperature, producing distillate vapor and a brine in the first effect; separating the distillate from the brine, further passing a second portion of the feed water to heat exchange with an external additional heat source to produce a heated feed water at a third temperature greater than the first temperature and passing a portion of the heated feed water to the first effect; and, passing the brine through additional effects to produce additional distillate vapor.

The invention further comprises a method for supplying additional heat to an absorption distillation process comprising a plurality of effects by passing a portion of the feed water at a first temperature to at least one effect and heating a second quantity of the feed water by heat exchange with an external additional heat source to a second temperature greater than the first temperature to produce a heated feed water and passing a portion of the heated feed water to at least one effect.

The invention further includes a method for supplying additional heat to an adsorption distillation process comprising: a plurality of effects by heating a portion of the feed water stream by heat exchange with an external additional heat source to produce a heated feed water stream; and, charging at least one of the heated feed water stream and a mixture of the heated feed water and the feed water stream to at least one of the effects.

The invention additionally comprises a distillation method for producing distillate from a feed water containing at least one dissolved material in a plurality of effects, each of the effects comprising a vessel, a heat exchanger and devices for transporting fluids, the method comprising: charging a quantity of a feed water stream to at least one effect at a first temperature; passing a portion of the feed water through a heat exchanger in the at least one effect to produce a distillate vapor and brine from the at least one effect; separating the distillate vapor from the brine; heating the heat exchanger in the first effect by passing a heating fluid to the heat exchanger in the first effect at a second temperature; and, heating a second quantity of the feed water by heat exchange with an external additional heat source to a third temperature greater than the first temperature to produce a heated feed water and passing a portion of the heated feed water to at least two effects.

The invention further comprises a method for producing distillate from a feed water containing at least one dissolved material in a plurality of effects, each of the effects comprising: a vessel, a heat exchanger and devices for transporting fluids, the method comprising: optionally passing a portion of the feed water at a first temperature to a first effect; heating the heat exchanger in the first effect by passing a heating fluid stream to the heat exchanger at a second temperature; producing distillate vapor and brine in the first effect; separating the distillate vapor from the brine; and, further heating a second quantity of the feed water by heat exchange with an external additional heat source to a third temperature greater than the first temperature to produce a heated feed water and passing a portion of the heated feed water to the first effect.

The invention also comprises a distillation method for producing distillate from water containing at least one dissolved material in a plurality of effects, each of the effects comprising: a vessel, a heat exchanger and devices for transporting fluids, the method comprising: charging a first quantity of a feed water stream at a first temperature to a first effect and through a heat exchanger in the first effect to produce a distillate vapor and brine from at least one effect; separating the distillate vapor from the brine; heating a first effect heat exchanger electrically to a second temperature; and, further heating a second quantity of the feed water by heat exchange with an external additional heat source to a third temperature greater than the first temperature to produce a heated feed water; and, passing a portion of the heated feed water to at least two effects.

DETAILED DESCRIPTION OF THE INVENTION

In the description of the Figures, the same numbers will be used throughout to refer to the same or similar components. Further, not all pumps, valves and the like necessary to achieve the flows described have been shown since such equipment is well known to those skilled in the art. The Figures are all discussed by reference to seawater, although the invention is not so limited.

Figure 1:
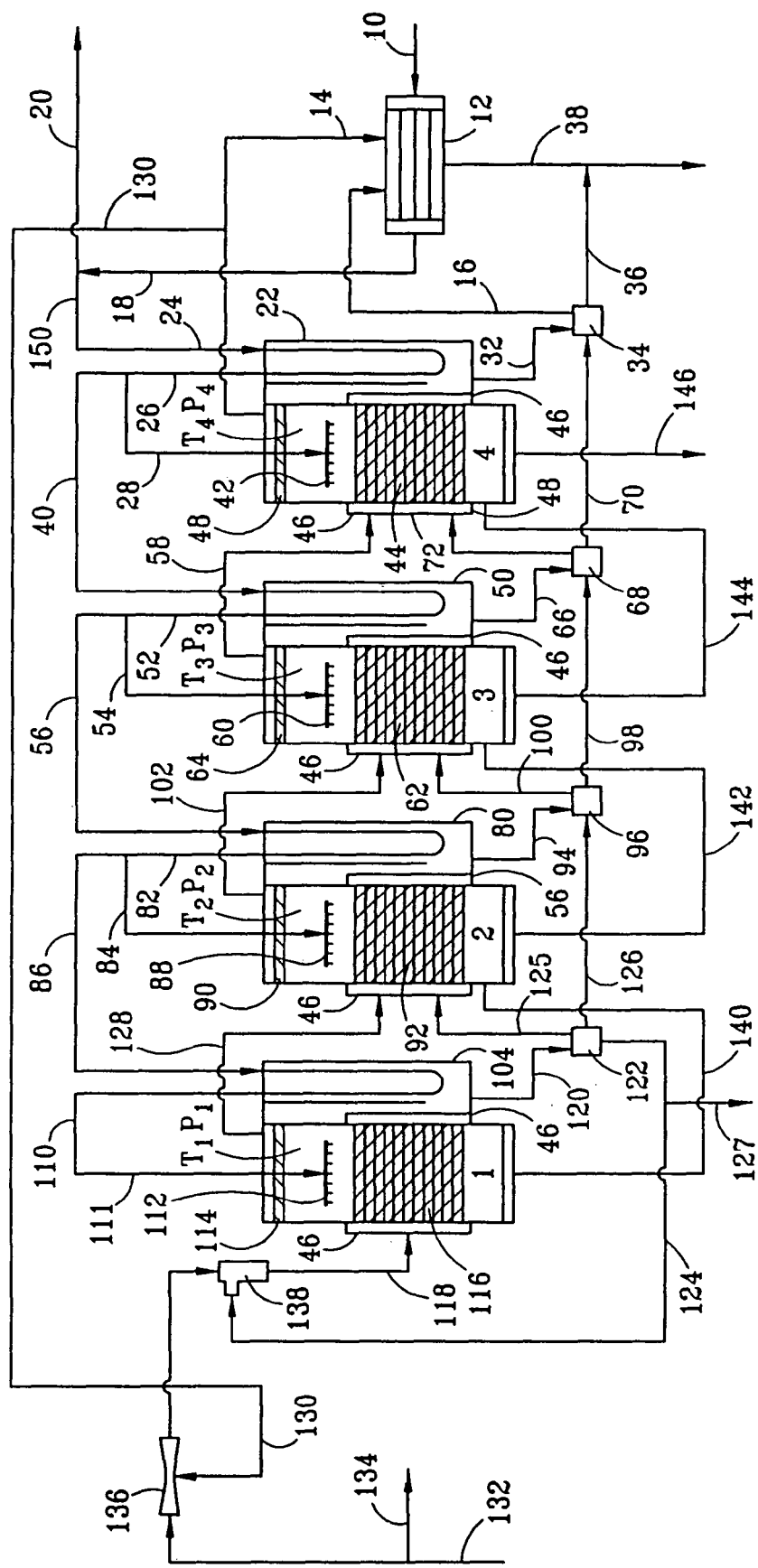
FIG. 1. is a schematic diagram of a prior art multi-effect distillation process, having four effects in a parallel/cross flow arrangement.

In FIG. 1 a prior art process is shown wherein an inlet water stream 10, containing both feed and cooling water, is passed to a heat exchanger 12 and heated by heat exchange with distillate vapor produced in the last effect. The distillate vapor streams are recovered through lines 14 and 16 and are condensed in heat exchanger 12 to produce distillate in a line 38. The feed water and cooling water leave heat exchanger 12 through a line 18 and cooling water is discarded through a line 20 to return to the sea or to other disposal. Feed water is passed through a line 24 to preheater 22 in effect 4 where it is heated and passed through a line 26 from which a portion is withdrawn through a line 28 and fed into effect 4. The feed stream is passed through a distribution system shown at 42, which is beneath a demister 48 and above a heat exchange section 44 (herein "tubes"), which is shown as heat exchange tubes, but could also be a plurality of plates, thin plastic sheets or any other suitable heat exchange surface as known to those skilled in the art. Tubes 44 include a header 46 on each end for the passage of vapor/liquid into tubes 44 and recovery of vapor/liquid from tubes 44. In the embodiment shown, distillate is recovered from effect 4 via a line 32 and passed to a flash box 34 where it is flashed into a liquid stream passed via a line 36 to a line 38 and a vapor stream is passed through line 16 to heat exchanger 12. A brine stream 146 is recovered from the bottom of effect 4.

The remaining portion of the feed water from pre-heater 22 is passed via a line 40 to a second pre-heater 50 where it is heated and recovered through a line 52 from which a portion 54 is withdrawn and passed into effect 3. Effect 3 includes a distribution system 60 through which the feed water is passed over tubes 62, which include headers 46, and a demister 64. Distillate is recovered from effect 3 via a line 66 and passed to a flash box 68 where it flashes into vapor which is passed via a line 72 to effect 4 with the liquid being passed via a line 70 to flash box 34.

A vapor stream is recovered through a line 58 from effect 3 and passes to tubes 44 in effect 4. The vapor from line 58 and line 72 heats the tubes so that feed water is vaporized in effect 4. The remaining liquid from pre-heater 50 is passed via a line 56 to a pre-heater 80 where it is heated and recovered via a line 82 with a portion of the feed water being withdrawn through a line 84 and passed through a distribution system 88 into tubes 92 in effect 2. A demister 90 is present in the upper portion of effect 2. A brine stream 142 is withdrawn from the bottom of effect 2 with a distillate stream being withdrawn through a line 94 and passed to a flash box 96 where a liquid stream is flashed and passed via a line 98 to flash box 68 with a flashed vapor stream 100 being passed along with a vapor stream 102 from effect 2 into tubes 62. The remaining feed water in line 86 is passed via a pre-heater 104 to a first effect with the feed water being recovered through a line 110 and passed to a distribution system 112. A demister 114 is positioned above the distribution system.

Tubes 116 are provided with a stream which comprises a distillate vapor stream recovered through a line 130 from effect 4, which is passed to a thermal vapor compressor 136, which compresses the distillate vapor in line 130 with motive steam supplied through a line 132. Steam is withdrawn through a line 134 for use to power a vacuum system, which is used to remove non-condensable materials from effects 1, 2, 3, 4 and condenser 12. Typically the pressure in the effects is less than 1 to about 8 psia.

The distillate stream may be withdrawn as shown via a line 120 and passed to a flash box 122 where the liquid stream is flashed. The flashed vapor stream 125 is passed along with the distillate vapor stream 128 from effect 1 into tubes 92, a portion of the flashed liquid stream is then recovered via a line 124 and mixed with the steam from the thermo-compressor in a desuperheater 138 via line 118, a portion is returned to the steam source via a line 127 and the remaining portion is passed to flash box 96 via a line 126. Feed water is passed to the first effect via line 110.

Figure 2:
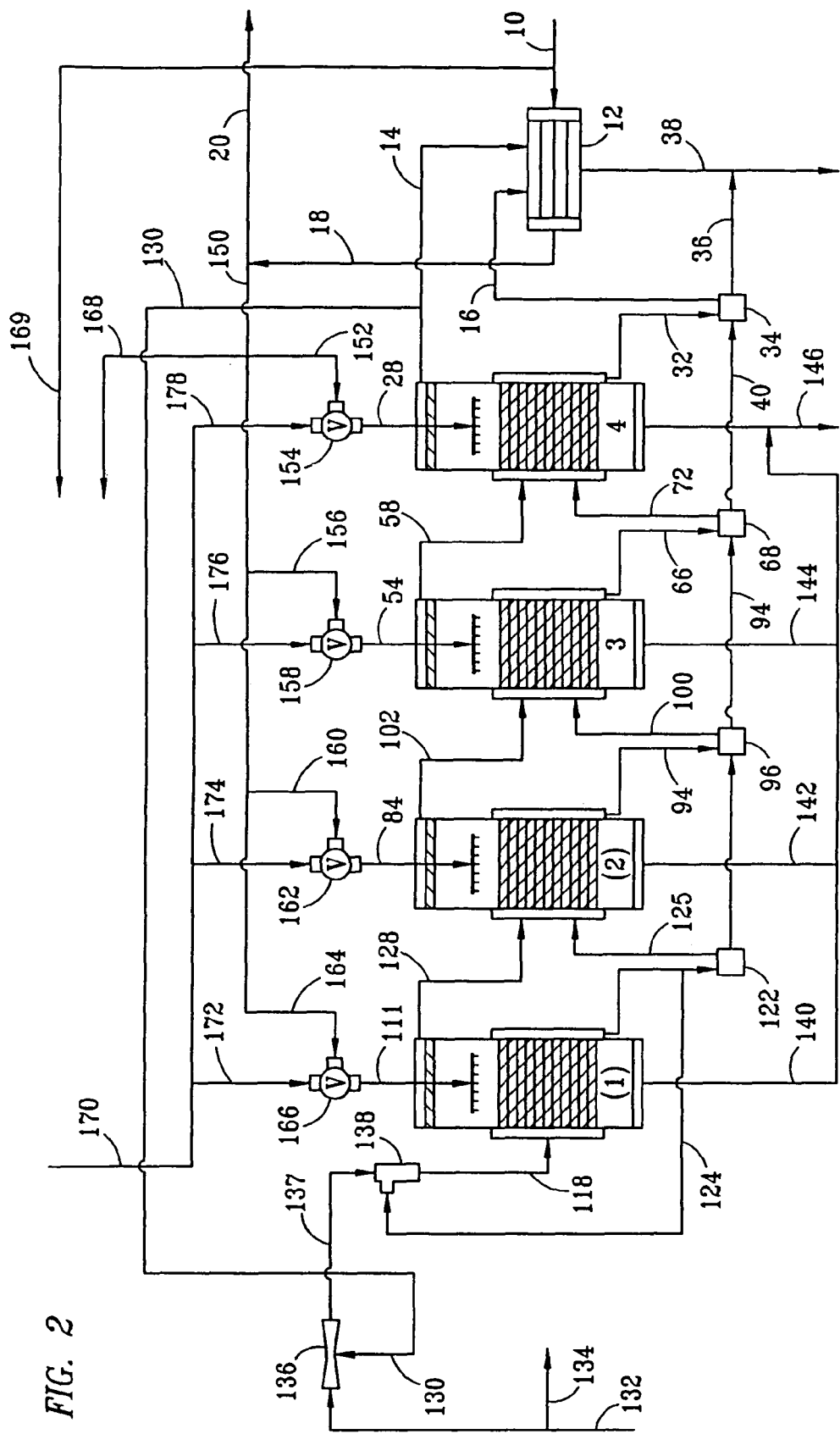
FIG. 2. is a schematic diagram of an embodiment of a multi-effect distillation process having four effects in a parallel arrangement according to the present invention.

Generally inlet water from line 10 is used as cooling and feed water. The inlet water is heated while condensing the vapor produced in the last effect of the process. A portion of the inlet water in line 20, called cooling water, is rejected while the remaining portion in line 150, called feed water, is delivered to the effects in a parallel cross-flow arrangement or other suitable flow arrangement (FIG. 2). Optionally brine and distillate coolers could be used to heat the feed water if desired.

Before entering the first effect of the unit, the feed water may be successively heated through conventional pre-heaters. The feed water is introduced into each effect after passing through its associated pre-heater. The feed water enters the shell side of the effect and flows in a falling film across the horizontal tubes. While falling in an evenly distributed thin film on the outside surface of the tubes, the feed water is heated and partially evaporated by heat obtained when vapor condenses on the inside of the tubes. The released distillate vapor flows through a demister and is transported to the subsequent effect on the condensing side of the tubes. The distillate vapor condenses to distillate water yielding its latent heat and subsequently heating and evaporating the feed water which flows in a falling film on the outside surface of the tubes. This process of simultaneous condensation and evaporation is repeated in all effects of the unit at successively reduced pressures and temperatures. Typically the temperatures in the effects vary from about 70 to about 160° F.

The heating steam to the first effect in line 118 is supplied by a thermal vapor compressor (TVC). The TVC uses high pressure motive steam to entrain a portion of the distillate vapor produced in a downstream effect, herein shown as the last effect of the distillation process. The mixture is then discharged as heating steam to the first effect. Condensate, line 124, is supplied to desuperheater 138 to control the final temperature of the heating steam. The TVC process effectively recovers heat that would otherwise be rejected as waste heat and increases the efficiency of the distillation process.

Generally the operation of the system results in the passage to tubes 116 of a distillate vapor and steam at a temperature suitable for use as a heating medium in tubes 116. As the tubes are selectively heated in each of the effects, the temperature in each of the effects decreases. In other words, $T_1>T_2>T_3>T_4$, as shown. Similarly, the pressure in the effects decreases through the effects. For instance, $P_1>P_2>P_3>P_4$. Some variation in this practice is possible.

A continuing problem is the conservation of heat energy as the streams move through successive effects. As discussed, the primary heat input to the system initially is through the steam (or other suitable heat source) received through line 132 and by the use of the distillate vapor stream in line 130. The recovery of a portion of the vapor stream from effect 4 through line 130 achieves the recovery of some heat that would otherwise be lost to feed water and cooling water in heat exchanger 12. The object of the multi-effect distillation process is the recovery of distillate from water at a low temperature and at high efficiency.

FIG. 1 has been described in greater detail than the other FIGs since the other FIGs comprise effects which are substantially the same as the effects used in this discussion.

In FIG. 2, an embodiment of a multi-effect distillation process very similar to that shown in FIG. 1 is shown and includes the improvement of the present invention and no pre-heaters. According to this invention, a portion of the feed water in line 150, withdrawn through a line 168, a portion of the feed water from line 10, withdrawn through line 169, or a combination thereof is heated externally with an additional heat source (not shown) to a temperature from about 140 to about 190° F. and returned via a line 170 to the process. Reference to an "external heat source" or to "heating externally" refers to the use of a heating source which is not otherwise a part of the distillation process. Higher or lower temperatures are possible depending on process parameters. This heated feed water is returned to the process as shown through any or all of lines 172, 174, 176, and 178. This heated feed water is added to the process through any or all of mixing valves 154, 158, 162 and 166, which mix the heated feed water with the feed water from heat exchanger 12 supplied to the effects via any or all of lines 152, 156, 160 and 164 to produce final feed water at a desired temperature in each of the effects. All of the heated feed water or the feed water could be added to any one of the effects or distributed to any portion of the effects in any proportions to achieve the desired temperatures or for any other purpose. The feed water could be heated by more than one external heat source at different temperatures or a feed water stream could be fed directly to any or all of the effects and heated in the effects with or without mixture with the heated feed water. Desirably the heated feed water is passed to at least two effects and preferably to all of the effects. The feed water streams and the ratio of added feed streams is selected to achieve a desired temperature in each effect. Desirably, the feed water is at a temperature less than or equal to the water saturation temperature in each effect.

A major advantage of this invention is the reduction of the quantity of high quality steam (or other high quality heat source) to produce a given quantity of distillate. Further, since the temperature required in the heated feed water recovered through line 170 is relatively low, this addition of heat can be obtained from lower value steam or other low value heat sources, which are at temperatures not generally considered useful for heat exchange purposes. This allows the improved performance of the multi-effect distillation process at a higher level of efficiency without the use of additional quantities of high quality steam. In the embodiments shown in FIGS. 1 and 2, the amount of steam required in the process in FIG. 2 is only 91 percent of the high quality steam required in FIG. 1 for the production of the same quantity of distillate from the same inlet feed water.

Figure 6:
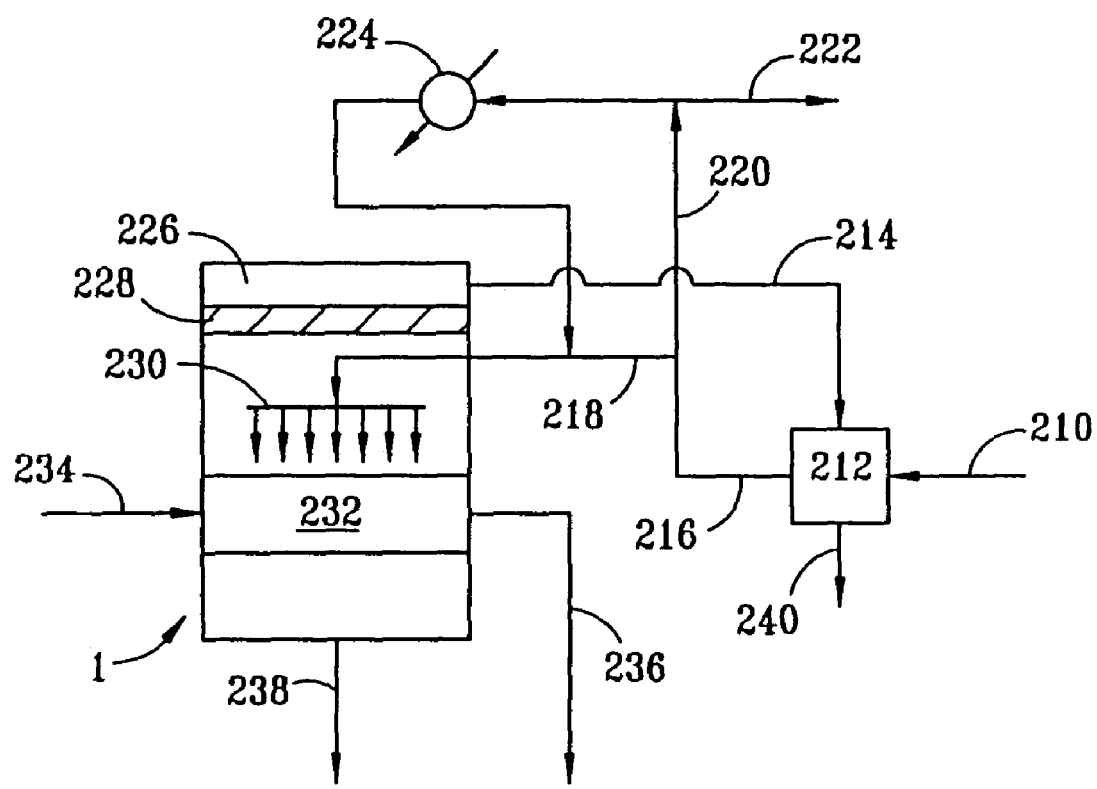
FIG. 6 is a schematic diagram of a single effect distillation process according to the present invention.

The gained output ratio or pounds of distillate produced per pound of high quality steam added for heat and for the vacuum system is 5.92 in FIG. 1 and 6.44 in FIG. 2. Clearly a significant improvement in efficiency in the use of high quality steam, which is more costly to generate and make available, has been achieved.

Figure 3:
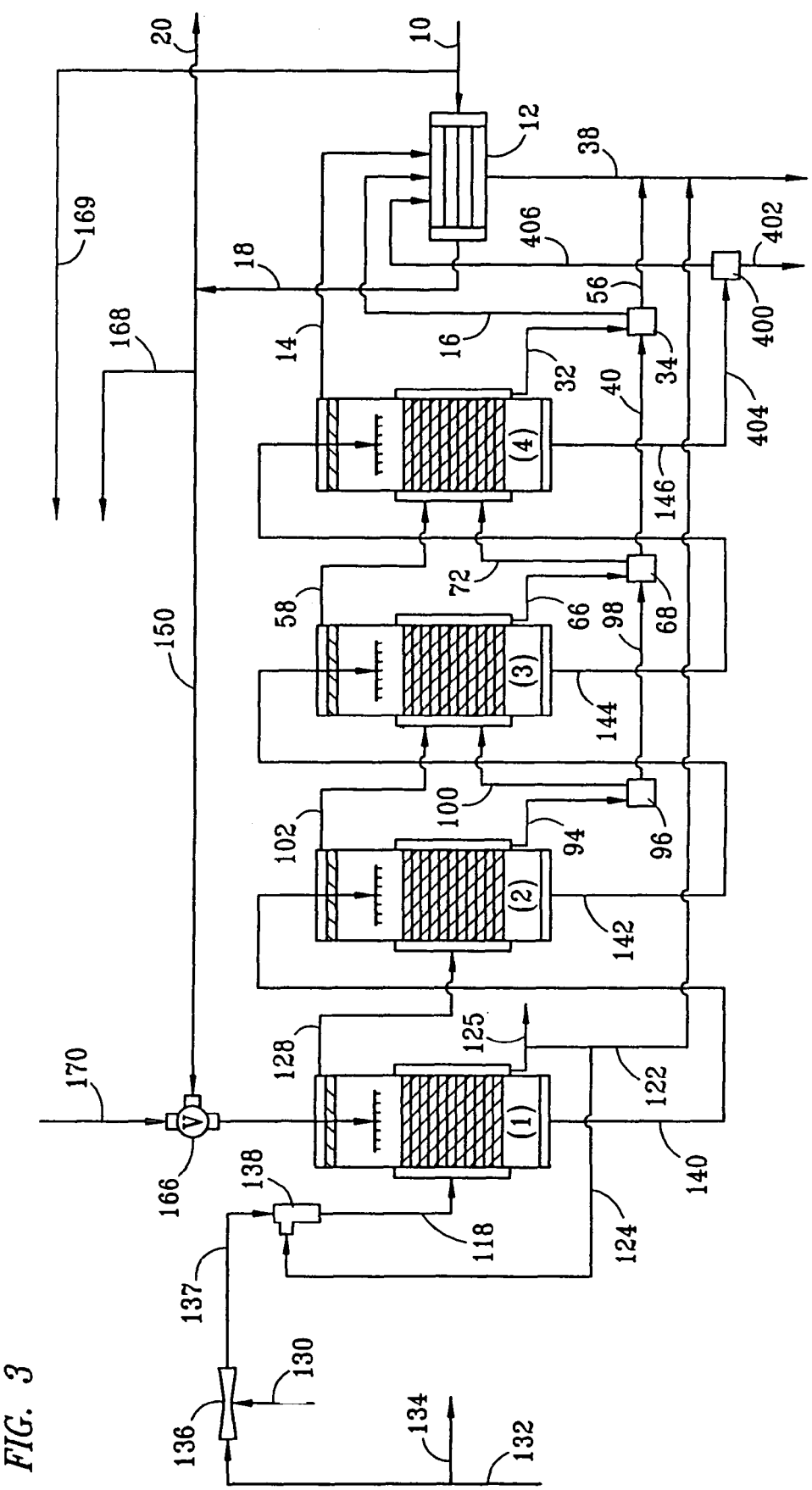
FIG. 3. is a schematic diagram of an embodiment of a multi-effect distillation process of the present invention having four effects in a forward feed arrangement.

In FIG. 3, a variation in the process is shown. In this embodiment, the heat is supplied to the tubes in effect 1 by the same system used in FIGS. 1 & 2. By contrast to FIGS. 1 and 2, where the brine streams were separately recovered from each effect, the total stream of feed water in this embodiment can be charged to effect 1, recovered from effect 1 and passed directly onward to effect 2 and then on to effect 3 and then effect 4. The recovery of distillate and vapor is as shown. As indicated previously, a large variety of arrangements can be used for the recovery of the vapor and distillate from the effects. All of the heated feed water (externally heated feed water from either or both of lines 168 and 169) is supplied via line 170 to effect 1 with either or both feed water from line 168 and optionally unheated feed water from a line 150. Flow through line 150 is controlled by control valve 166. Alternatively, only heated feed water could be charged to effect 1 or any mixture of heated feed water, feed water and unheated inlet water could be charged to effect 1.

In prior art embodiments, the use of the stream of feed water withdrawn through line 168, passed to external heating and returned via line 170, according to the present invention, is not used. According to the present invention, additional heat can be supplied by use of the heated feed water in line 170, which is passed to effect 1. This also facilitates the production of the desired temperature and pressure conditions in each of the effects with the resulting increase in efficiency.

In a comparison of the practice of the process shown in FIG. 3 without the use of the addition of the heated feed water stream in line 170 to a process wherein the use of the heated feed water in line 170 is used, for the production of the same quantity of distillate it is noted that by the use of the heated feed water in line 170, the requirement for high quality steam has been reduced to 84 percent of the high quality steam required without the use of the invention. By the use of the invention, the gained output ratio (pounds of distillate per pound of high quality steam for heating and the vacuum system) is equal to 7.37, whereas in the system without the invention, the comparable ratio is 6.19. Again, a substantial improvement in efficiency has been achieved by the practice of the present invention.

Figure 4:
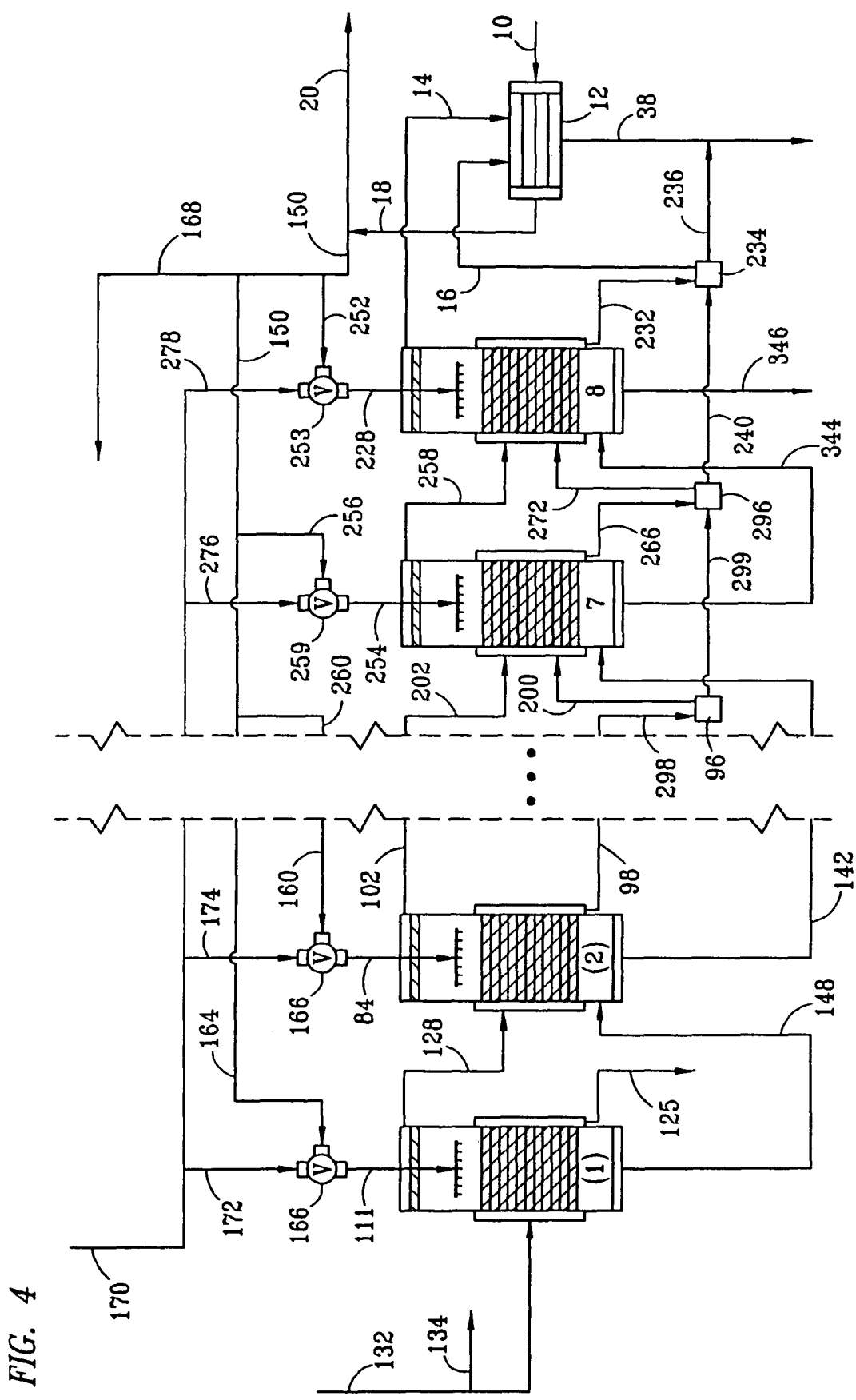
FIG. 4. is a schematic diagram of an embodiment of a multi-effect distillation process of the present invention having eight effects in a parallel/cross flow arrangement.

In FIG. 4, an embodiment is shown wherein only steam is used for heating in the evaporator tubes in effect 1. By comparison of this system, as shown with the present invention, to a comparable system without the use of the invention, the quantity of high quality steam required with the invention has been reduced to 60 percent of the amount required without the practice of the invention. The gained output ratio of this embodiment with the invention is 9.3 for the process as shown in FIG. 4, by comparison to an output ratio of 5.8 without the use of the present invention.

In FIG. 4, various flow lines have been renumbered since the diagram is of an eight effect process. For instance, the lines conveying portions of the heated feed water in line 170 into effects 7 and 8 have been renumbered as lines 276 and 278. A line 252 conveys heated feed water to a valve 253 for passage through a line 228 to effect 8. A line 232 passes distillate from effect 8 to a flash box 234 and line 236 passes distillate to line 38. Similarly, the brine recovery lines 344 and 346 correspond to the lines previously described for the first four effects. Feed water is passed through a line 256 to a mixing valve 259 and to effect 7 via a line 254. Lines 202 and 200 convey distillate vapor from effect 6 and from flash box 96, respectively, to the tubes in effect 7 with the distillate vapor from effect 6 being passed through line 298 to flash box 96. The distillate liquid is then passed through a line 299 to a flash box 296 and on to a line 240 to a flash box 234.

Figure 5:
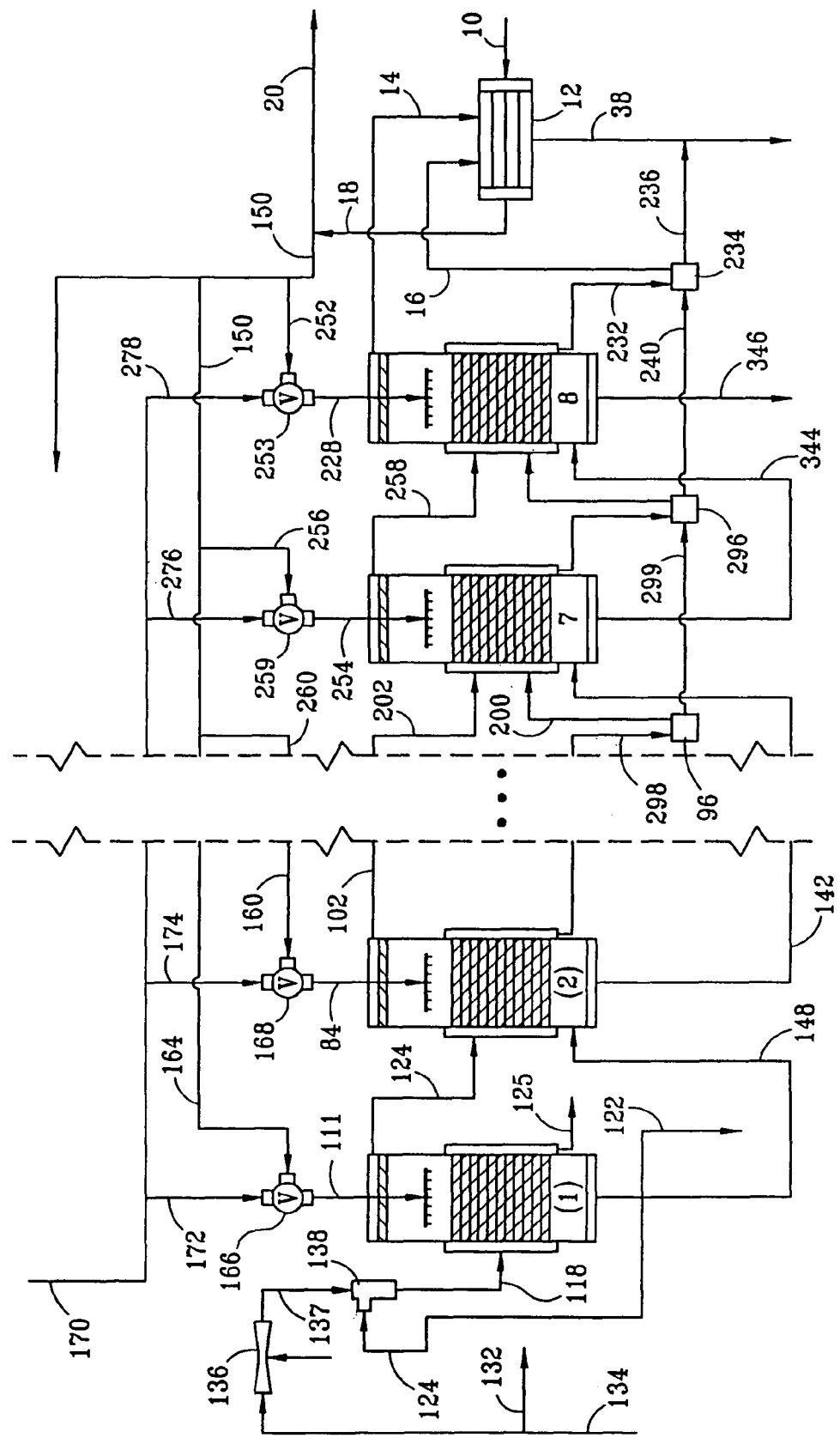
FIG. 5 is a schematic diagram of an embodiment of a multi-effect distillation process of the present invention having four effects in a parallel/cross flow arrangement with thermal compression.

In FIG. 5 an 8 effect process is shown. By comparison to a comparable process without the invention, this process with the invention requires only 75% as much high quality steam. The gained output ratio with the invention is 15.8 by comparison to a gained output ratio of 11.8 without the use of the present invention.

The foregoing discussion of FIG. 5 has clearly demonstrated that by the use of the present invention, additional heat can be readily externally introduced into the multiple effect distillation process efficiently and with greater process control. This permits more efficient operation of the respective effects.

In the present invention, the feed water is heated in whole or in part by an external heating process which decreases the amount of steam required for the production of distillate in the first effect and increases the amount of distillate vapor available to the down stream effects. This external heating has the benefit of allowing additional vapor production in each effect with a correspondingly greater distillate production for each pound per hour of higher quality motive or heating steam (or other primary heat source) provided. Thus a larger percentage of the overall distillate product is produced in the latter effects of the distillation system of the present invention as compared to previous distillation designs. Therefore the top effect of the distillation plant design of the present invention will have a lower brine salinity exiting the heat exchange surface which enables higher top brine temperatures than currently practiced in the art. Increased top brine temperatures allow the use of reduced surface areas, leading to lower cost evaporators. Due to the higher top brine temperature permissible by the present invention, an increased number of effects could be included in the process of the present invention. The top effect of the present invention is less susceptible to scale formation when operated at similar top brine temperatures, allowing a lower fouling factor in design and leading to a lower cost evaporator than previously used in the art.

Further, since heating the feed water added to the respective effects is at relatively low temperatures, this heat can be recovered from a variety of process streams. These streams can be from any suitable heat source of relatively low value. Heat sources of higher value can be used if desired but at greater expense. Further other heat transfer fluids or electrical heating could be used as a heat source. This added heat allows a reduction in the quantity of high quality heat value otherwise required and permits additional efficiency as well. The high quality heat value is relatively expensive and is a major operating expense of the process.

While the previous embodiments have shown multi-effect distillation processes, it is noted that single effect distillation processes are also useful with the present invention.

In FIG. 6, a schematic diagram of an embodiment of a single effect process according to the present invention is shown. In this process, a seawater stream 210 is passed to a heat exchanger 212 where it exchanges heat with a distillate vapor stream 214 from the first effect. The distillate vapor stream is condensed to produce a distillate product stream through a line 240. The heated seawater is then passed through a line 216 to either a line 218 as a feed water stream to effect 1 or to line 220 from which a portion is withdrawn through a line 222 and returned to the sea or other disposal. A selected quantity of feed water in line 220 is passed to a heat exchanger 224 where it is heated by heat exchange with an external heat source to produce heated feed water, which is returned to combine with the feed water in line 218. It will be understood that up to all of the feed water passed to effect 1 could be heated feed water from line 220. In effect 1, distillate vapor is produced and transferred through line 214 to heat exchanger 212. A demister 228 is positioned over a distribution system 230, which distributes the feed water over an evaporator section 232 to produce vapor, which is recovered through line 214. Heat exchanger 232 is supplied with steam or another suitable heating fluid via a line 234 with the spent heating fluid being recovered through a line 236. A brine stream is recovered through a line 238 and may be returned to the sea or otherwise passed to disposal.

The use of such single effect systems is less common for large industrial applications since they are less efficient. A primary use for such systems is on ocean-going vessels and the like.

The operation of such a single effect process is shown in *Fundamentals of Salt Water Desalination,* by Hisham T. El-Dessouky and Hisham M. Ettouney, Kuwait University, Elsevier Science B.V., 2002, pages 20-23, 81-85, 110-113, 129-131 and 260-269.

As previously indicated, the use of such single effect processes is well known and the efficiency of such processes is readily improved by the process of the present invention when low value heat is available for use in heat exchanger 224. Other sources of heat could be used in heat exchanger 224 if desired. The efficiency improvement with respect to high quality steam, which is typically used in line 234 as the heating fluid for evaporator 232, is significant when lower value heat sources are available for heating the feedstream in line 220. If low value heat sources are not available, higher value heat sources could be used but the improvement in the economic efficiency of use of higher value heat sources is reduced.

Figure 7:
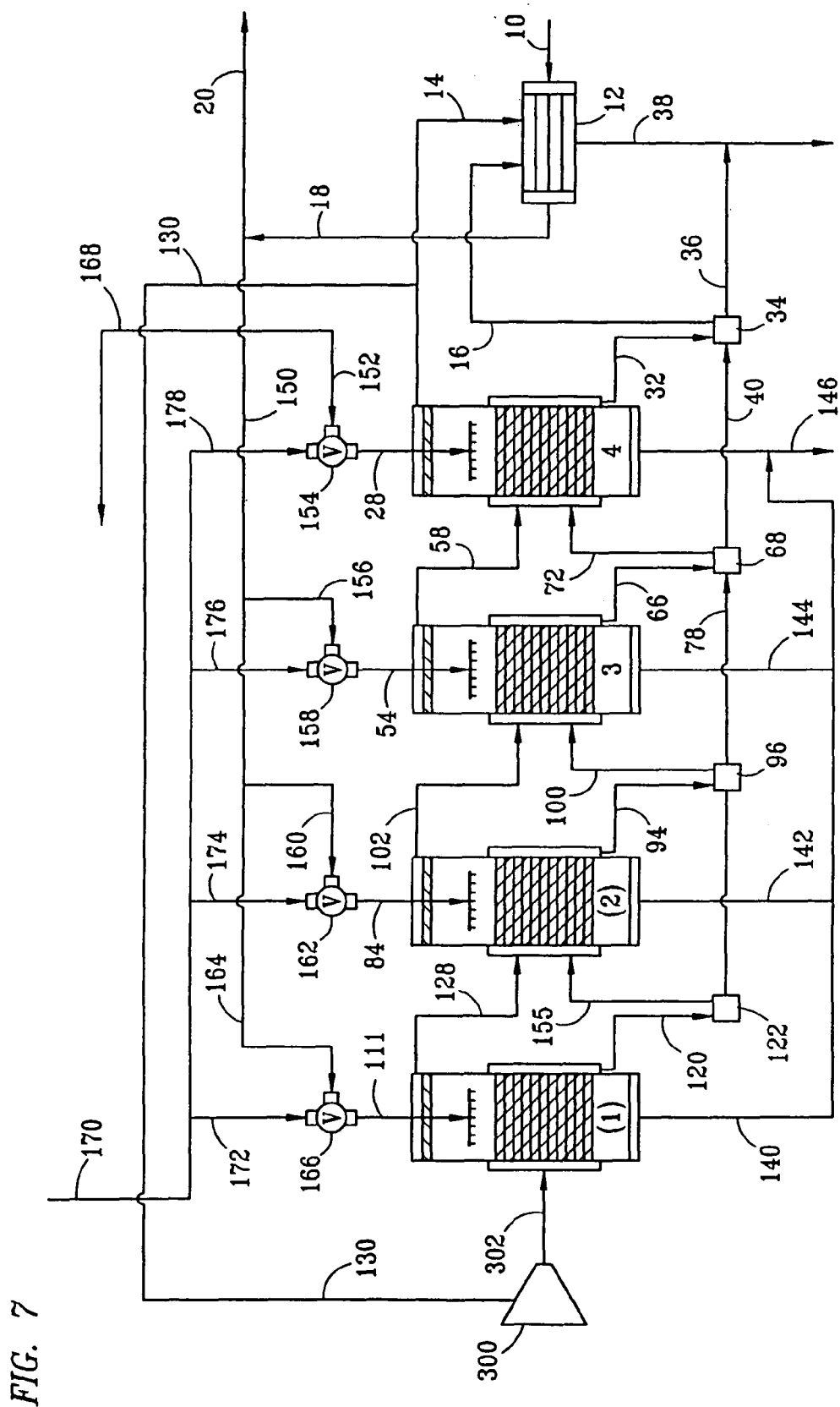
FIG. 7 is a schematic diagram of a mechanical vapor compression embodiment according to the present invention.

In FIG. 7, an embodiment similar to that shown in FIG. 2 is shown. A compressor 300 is used to compress the recovered distillate vapor stream in line 130 to heat the stream which is then passed through a line 302 into the heat exchange section of the first effect. The stream recovered from the heat exchange section is then passed through line 120 to first flash box 122. The use of mechanical vapor compression as an alternative to thermal vapor compression is well known to those skilled in the art. Both types of compression for use with the stream charged as the heating stream to the evaporators is well known and both variations are effective with the process of the present invention. With the use of mechanical vapor compression, it may not be necessary to condense the distillate vapor in lines 14 and 16 since the product distillate may be recovered only via line 36 with the distillate vapor from lines 14 and 16 being recycled to compressor 300. The feed water may also be warmed by heat exchange with the distillate and brine exiting the system in addition to further heating with external heat values, as when practicing the present invention. The embodiment of a single effect process similar to FIG. 7 may also be practiced with the present invention.

Figure 8:
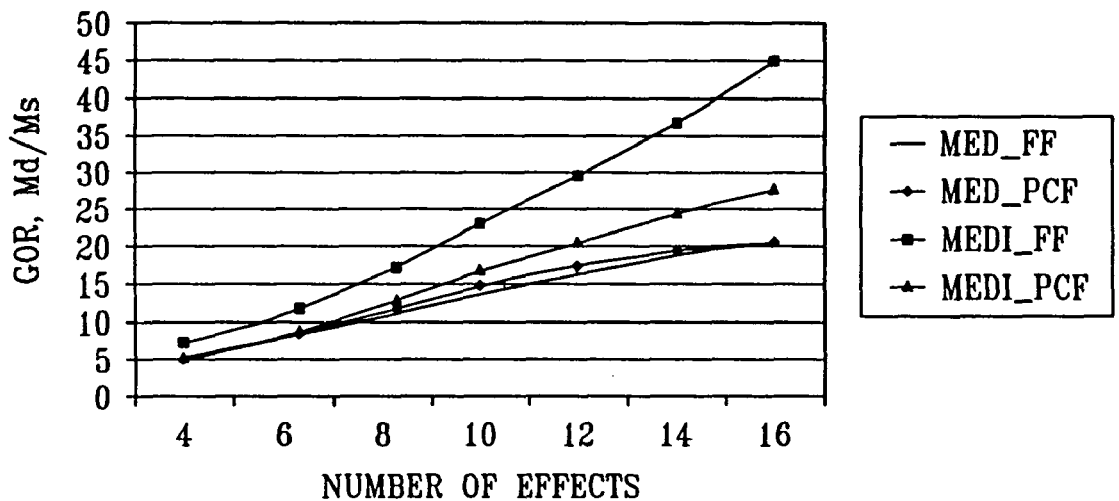
FIG. 8 is a graph showing the weight ratio of the quantity of distillate produced per unit of high quality steam used according to the process of the present invention; and, FIG. 9 is a graph showing the quantity of distillate produced as a function of the total heat input to the process as shown.

In FIG. 8, a graph is shown of the quantity of distillate produced per quantity of high quality steam for a multiple effect distillation process with thermal vapor compression, both with a forward feed and with a parallel cross-flow feed system and both with and without the invention. The logos MEDi-FF and MEDi-PCF refer to results with the invention shown in a forward feed and in a parallel/cross-flow arrangement in FIG. 8 and in FIG. 9. The logos MED-FF and MED-PCF refer to comparable processes without the invention. It is clear that particularly with the forward feed, the use of the invention has greatly increased the efficiency of the process as measured by the amount of distillate produced per pound of high quality steam. A similar but less striking advantage is achieved with the parallel/cross-flow system.

It is clear that with all configurations, both with and without the invention, the efficiency is improved by the use of an increased number of effects. Typically no more than 16 effects have been used with the actual number of effects being dependent on operating temperature differences and economics.

This clearly shows that a significant improvement has been made in the process efficiency. This increased efficiency is seen in the reduced quantities of high quality steam required to produce a given quantity of distillate.

Figure 9:
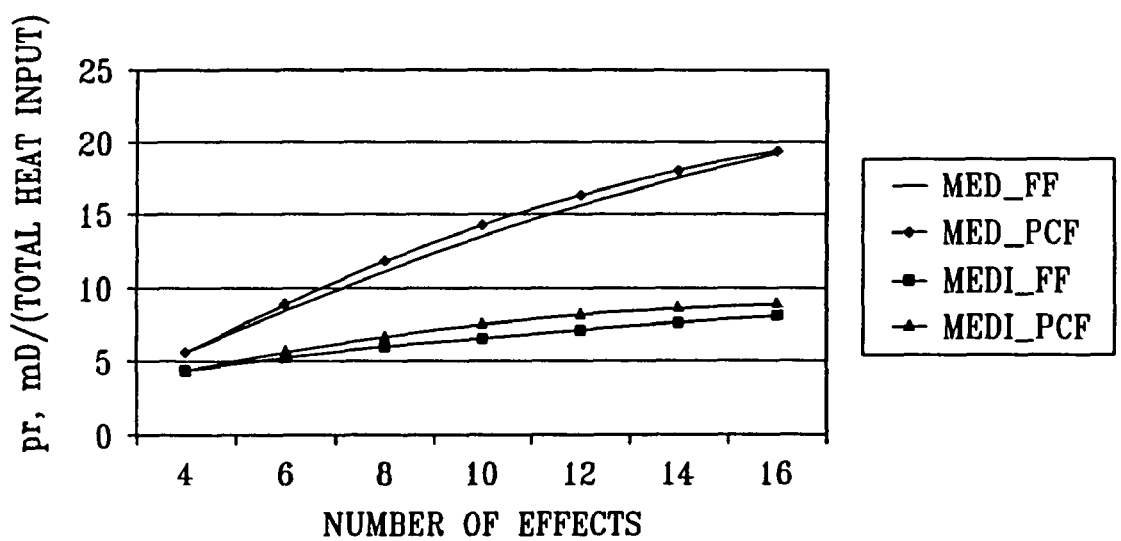

In FIG. 9, it is shown that the quantity of distillate produced as a function of the total heat input is less according to the present invention than with the processes that do not use the improvement of the present invention. This is clearly evident upon a review of the processes where additional heat is added. The added heat, according to the present invention, is available from sources which may be lower quality sources of heat. Since the multi-effect distillation process does not require high temperatures, heat can be recovered from these potential low or no value streams for use to generate valuable distillate from this process. According to the present invention, this process has been improved by producing additional distillate from low value or no value low temperature streams which would not be otherwise useful for heat exchange.

It is recognized that a wide variety of configurations of the process flow can be used. Generally the effects are of uniform construction and are relatively economically produced and operated.

In FIG. 1, pre-heaters are positioned with each of the effects. The pre-heaters are of various sizes and configurations as required to achieve the particular amount of heating desired for the operation of the following effect. This adds considerably to the expense to fabricate and install the facility as well as the complexity of operation to coordinate more variables. This variation also does not result in the addition of any heat to the process but simply involves additional heat exchange within the process.

The improvement of the present invention is also effective with processes such as single and multi-effect absorption and single and multi-effect adsorption processes. Such processes are discussed in *Fundamentals of Salt Water Desalination*, by Hisham T. El-Dessouky and Hisham M. Ettouney, Kuwait University, Elsevier Science B.V., 2002, pages 129-131 and 260-269. These processes operate in a similar fashion and it is equally effective to provide additional heat to these processes by the improvement of the present invention as discussed above.

The improvement of the present invention is much more efficient than the use of such pre-heaters since it adds additional heat to the effects where it is desired. This provides additional process flexibility and produces additional distillate, as indicated previously, with heat recovered optionally from heat sources which would otherwise be of little or no value.

The brine streams recovered may be used as desired for heat exchange or may be diluted to a desired value for disposal in the sea or otherwise.

As previously noted, an effect comprises a vessel, a heat exchanger, and devices for transporting various fluids between the effects. Processes using a single effect are also known. Diverse designs have been used for the heat exchanger, such as horizontal tubes with a falling water film on the outside, vertical tubes with a falling water film on the inside, plates with falling water film and the like. Other heat exchange systems could also be used if found to be effective. Desirably the heat exchanger should be adapted to heat a thin film of water flowing over the heat exchanger surfaces while minimizing the deposition of solids from the water in the form of scale on the heat exchange surfaces.

In the heat exchanger, the heating has been shown by steam, in combination with distillate vapor or by mechanical vapor compression of distillate vapor. The process could also be operated by the use of any suitable heating fluid, such as oil (especially thermally stable oils), steam, heated water, gas, heated gas and the like to heat the heat exchanger in the first effect. Substantially any suitable heating fluid can be used so long as it is effective to transfer heat through the heat exchange section to vaporize a portion of the feed water to produce the desired distillate vapor and brine stream from the effect. Alternatively, the heat exchangers could be heated by electrical resistance heating or the like.

Similarly, a wide variety of arrangements and flow patterns can be used. For instance, a portion of the feed water could be withdrawn, passed to external heating with a source of low value heat or higher value heat if desired for return in selected quantities to each of, or a portion of, the effects. These variations may be used equally well with embodiments where the brine is recovered from the bottom of each effect with the distillate vapor being recovered from the top of each effect and passed onward to the next effect as a heating medium for the heat exchanger or for processes where the brine is routed back to the inlet to the next downstream effect successively so that more concentrated brine is produced. With the passage of the brine through the additional effects, additional feed water can be added to each of the effects or to a portion of the effects at a selected temperature.

According to the present invention, it has been found that by the use of a heated feed water stream, which desirably comprises a portion of the feed water, additional efficiency can be accomplished. The heated feed water stream is passed to each of the effects or some of the effects, especially to the first effect, to optimize the efficiency in the effect. While in the embodiments shown in many instances, the feed water is passed through a heat exchange system wherein the product distillate vapor is condensed, it is not necessary that this particular arrangement be used. The distillate may be passed to heat exchange with other streams and the feed water may be charged without preheating if desired. The use of a heated feed water stream heated by external heat, preferably low value heat, is desirably added back to one or more of the effects to facilitate temperature and efficiency control in each of the effects.

As noted previously, processes of this type can be operated in a wide variety of configurations. For instance, it may be desirable in some instances to introduce one or more feed water streams from different sources, with the heated water stream being drawn from one or more sources, heated to a desired temperature and then passed to the process. Such variations are within the scope of the present invention.

While the present invention has been described by reference to certain of its preferred embodiments, it is pointed out that the embodiments described are illustrative rather than limiting in nature and that many variations and modifications are possible within the scope of the present invention. Many such variations and modifications may be considered obvious and desirable by those skilled in the art based upon a review of the foregoing description of preferred embodiments.

What is claimed is:

1. A distillation method for producing distillate from a feed water stream containing at least one dissolved material in a plurality of effects, each of the effects comprising a vessel, a heat exchanger and devices for transporting fluids, each of the effects receiving a feed water, a heated feed water or a combination thereof, the method comprising:
   a) passing a portion of the feed water at a first temperature to at least one effect and through a heat exchanger wherein the at least one effect to produce a distillate vapor and brine from the at least one effect;
   b) separating the distillate vapor from the brine;
   c) heating at least a portion of the heat exchangers by passing a stream comprising at least one of steam and distillate vapor from a downstream effect to the heat exchanger in the first effect at a second temperature; and,
   d) further heating a second quantity of the feed water by heat exchange with at least one external heat source to a third temperature greater than the first temperature to produce a heated feed water and passing a portion of the heated feed water to at least two effects.

2. The method of claim 1 wherein the heat exchanger is horizontal heated tubes to heat a falling film of water to produce water vapor, vertical tubes with a falling water film on the inside or plates with a falling water film.

3. The method of claim 1 wherein the feed water is seawater.

4. The method of claim 1 wherein all of the feed water is heated by heat exchange with at least one external heat source.

5. A distillation method for producing distillate water from a feed water stream containing at least one dissolved material in a plurality of effects, each of the effects comprising a vessel, a heat exchanger and devices for transporting fluids, the method comprising:
   a) passing a portion of the feed water at a first temperature to a first effect;
   b) heating the heat exchanger in the first effect by passing an inlet stream comprising at least one of steam and a distillate vapor from a downstream effect to the heat exchanger in the first effect at a second temperature;
   c) producing distillate vapor and brine in the first effect;
   d) separating the distillate vapor from the brine;
   e) further heating a second quantity of the feed water by heat exchange with at least one external heat source to a third temperature greater than the first temperature to produce a heated feed water and passing a portion of the heated feed water to the first effect; and, f) passing the brine through additional effects to produce additional distillate vapor.

6. The method of claim 5 wherein the heat exchanger comprises horizontal heated tubes to heat a falling film of water to produce water vapor, vertical tubes with a falling water film on the inside or plates with a falling water film.

7. The method of claim 5 wherein the heated feed water is an inlet feed to the first effect.

8. The method of claim 5 wherein the feed water is seawater.

9. A distillation method for producing distillate from feed water containing at least one dissolved material in a plurality of effects, each of the effects comprising a vessel, a heat exchanger and devices for transporting fluids, the method comprising:

a) charging a quantity of feed water to a first effect at a first temperature;

b) passing a portion of the feed water to at least one effect and through a heat exchanger in the at least one effect to produce a distillate vapor and brine from the at least one effect;

c) separating the distillate vapor from the brine;

d) heating the heat exchanger in the first effect by passing a heating fluid to the heat exchanger in the first effect at a second temperature; and, e) heating a second quantity of the feed water by heat exchange with at least one external heat source to a third temperature greater than the first temperature to produce a heated feed water and passing a portion of the heated feed water to the first effect.

10. The method of claim 9 wherein the heating fluid is oil, steam, heated water, gas or a heated gas.

11. The method of claim 9 wherein a portion of the heated feed water is passed to each of the effects.

12. A distillation method for producing distillate from feed water containing at least one dissolved material in a plurality of effects, each of the effects comprising a vessel, a heat exchanger and devices for transporting fluids, the method comprising:

a) charging a first quantity of a feed water stream at a first temperature to at least one effect and through a heat exchanger in the at least one effect to produce a distillate vapor and brine;

b) separating the distillate vapor from the brine;

c) heating the first effect heat exchanger electrically to a second temperature; and, d) further heating a second quantity of the feed water by heat exchange with at least one external heat source to a third temperature greater than the first temperature to produce a heated feed water and passing a portion of the heated feed water to at least one effect.

* * * * *